April 14, 1942.  R. L. ROBINSON ET AL  2,279,840
SHEEP DRENCHING APPARATUS
Filed April 29, 1940  2 Sheets-Sheet 1
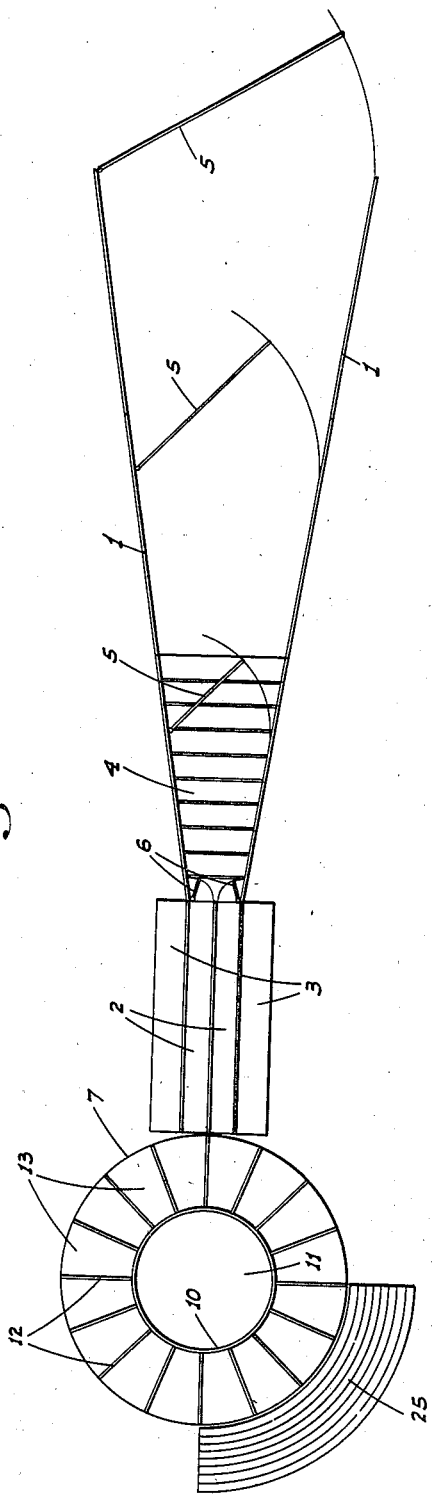
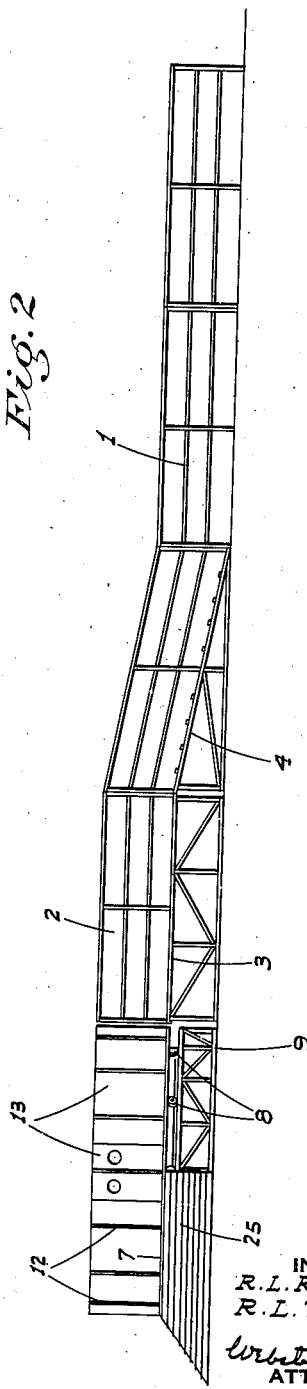
INVENTOR
R. L. Robinson
R. L. Thompson
ATTORNEYS April 14, 1942.   R. L. ROBINSON ET AL   2,279,840
SHEEP DRENCHING APPARATUS
Filed April 29, 1940   2 Sheets-Sheet 2
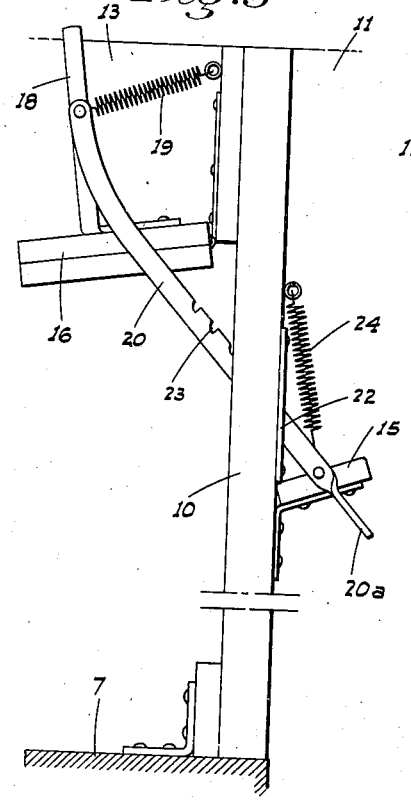
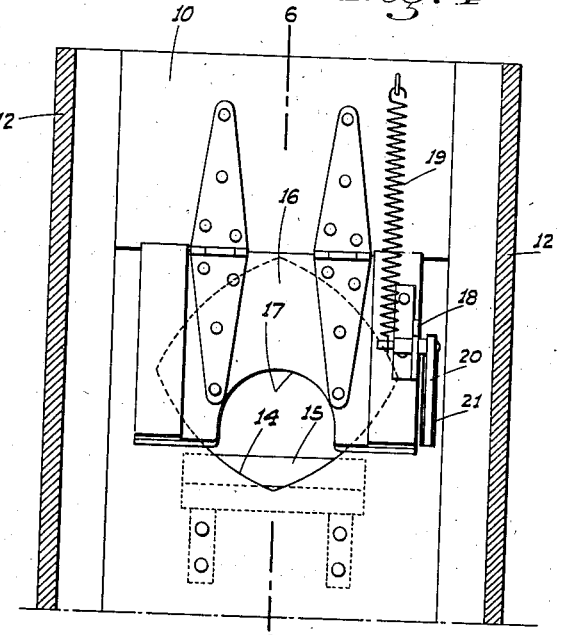
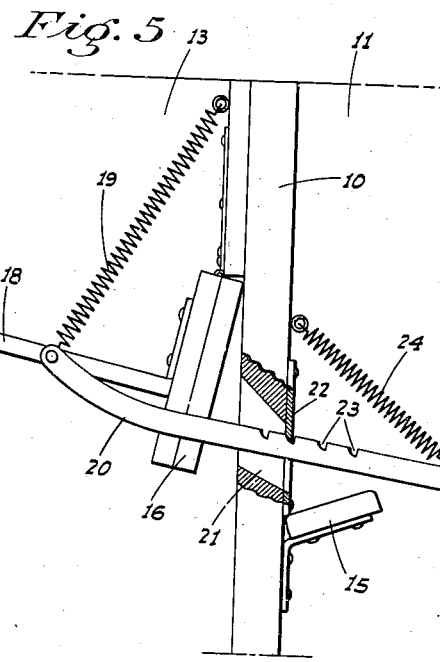
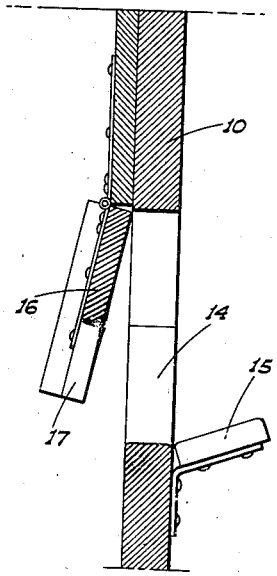
INVENTOR
R. L. Robinson
R. L. Thompson
BY
ATTORNEYS Patented Apr. 14, 1942

2,279,840

UNITED STATES PATENT OFFICE 2,279,840

SHEEP DRENCHING APPARATUS

Robert L. Robinson and Robert L. Thompson, Oakdale, Calif.

Application April 29, 1940, Serial No. 332,134

12 Claims. (Cl. 119—98)

This invention relates to apparatus for use in connection with the treatment of sheep with a drenching syringe, to combat various internal parasites with which sheep become infected.

At present, as is well known to those in the industry, the carrying out of drenching operations is a slow task, trying and tedious to both men and animals.

It is therefore the principal object of our invention to provide an apparatus which enables the sheep to be concentrated at a desired point for drenching, and to be handled and passed through the apparatus with a minimum of time, effort and handling of the sheep by the men.

A further object is to provide an apparatus for the purpose which is designed to be made up of a number of readily assembled or dismantled sections, so that the apparatus may be considered as being a portable unit, and may be taken from one place to another, or stored in a relatively compact form when not in use.

As an essential part of our apparatus, it is also an object to provide what we believe to be a novel form of clamping collar or stanchion for the sheep, arranged so that the head of the sheep may be firmly held in a proper position for drenching, and from which the sheep may be instantly released at the option of the operator.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a somewhat diagrammatic plan view of the apparatus.

Figure 2 is a similar side elevation of the apparatus.

Figure 3 is an enlarged fragmentary end elevation of a neck clamping unit in open position.

Figure 4 is a similar front or stall side of the unit as closed.

Figure 5 is a view similar to Fig. 3 showing the unit in closed or clamping position.

Figure 6 is a vertical section on line 6—6 of Fig. 4.

Referring now more particularly to the characters of reference on the drawings, the apparatus comprises a corral adapted to be erected in the sheep yard and comprising sectional side fence units 1 arranged in converging relation to one end. The corral at its small end connects with a pair of adjacent and parallel elevated chutes or runways 2, alongside which and on the same level are operating platforms 3. In order to enable the sheep to reach the chutes, the adjacent corral portion is provided with a cleated ramp 4. Manually operable swing gates 5 are mounted on the fencing on one side of the corral at longitudinally spaced points (thus providing a number of pens), as well as individual gates 6 for the chutes at their intake end.

The chutes discharge onto a circular ring-like platform or turntable 7, turnably supported by rollers 8 or the like from a stationary demountable framework 9.

Mounted on and upstanding from the platform is a wall 10 of polygonal form concentric with the platform and of sufficient diameter to provide an enclosure 11 in which preferably two operators may stand and conveniently manipulate the drenching syringes. The platform terminates at the wall, so that these operators stand on the ground.

The platform area outside the wall is divided by radial partitions 12 into a plurality of stalls 13, each of a width and depth to receive a single sheep from a chute. The wall 10 also forms the head of the stalls, the wall portion for each stall being of course flat and being provided with an opening 14 of sufficient size, and at the proper level, to receive the head and neck of a sheep therethrough. A chin rest 15 is mounted at the bottom of the opening on the side of wall 10 opposite the stall. This chin rest, and its relationship to the bottom of opening 14, is an important factor in the successful operation of the structure. The bottom of said opening forms a surface on which the neck of the sheep, when held in position, definitely rests. The chin rest, as will be seen, slopes up from this neck supporting surface, so that the head of the sheep is disposed in such a sloping position that the animal naturally tends to swallow. The drenching fluid when injected into the mouth will thus readily flow down the throat of the sheep as is intended.

Hinged on the wall 10 on the stall side just above the opening 14 is a plate 16 extending the full width and depth of the opening when disposed parallel to wall 10, and having a substantially semicircular opening 17 cut up in its bottom edge. This opening cooperates with the lower portion of opening 14 and is of sufficient size to engage the neck of a sheep, the plate 16 thus forming a neck holding or clamping collar, A bar 18 is secured on and projects from the stall face of the plate 16 adjacent one side thereof and at right angles thereto, the bar being connected to wall 10 by a tension spring 19 disposed so as to normally hold plate 16 up and clear of opening 14 as shown in Fig. 3.

A latch bar 20 is pivoted on bar 18 intermediate its ends and projects through a vertical slot 21 in wall 10 and through a latch plate 22 fixed on the operating or enclosure side of said wall. The bar 20 is provided with notches 23 on its upper edge to engage the latch plate, being normally held in such engagement by a tension spring 24 between the bar and wall 10.

In operation, the sheep are herded into the chute, being held in batches and against crowding by suitable manipulation of the pen gates 5 and 6. As the sheep move in single file along the chute, they are distributed from one chute or the other into the various stalls 13 by rotation of the platform 7 past the runways, the sheep advancing into the stalls until their heads and necks project through openings 14.

The operator on the platform 3 who is guiding the sheep into the stalls depresses the plates 16 successively and into a neck clamping position by grasping and pulling out and down on bars 18. As this is being done, the latch bar 20 slides of itself into a latched or holding position, preventing the sheep, if attempting to back out, from swinging the clamping collar up to a release position.

The head of the sheep is thus held projected through the wall 10 and into the operating enclosure, enabling an operator in enclosure 11 to manipulate the drenching syringe without trouble. When this operation is completed the operator merely depresses bar 20 with one hand, the free end of said bar being formed as a handle 20a. This releases the notches from the latch plate. The spring 19, aided by the natural backing-out movements of the sheep, immediately swings the clamping collar to a release position. The sheep then returns to ground level from its stall by means of a curved cleated ramp 25 which extends about platform 7 for a portion of its extent.

Since the turntable holds a number of sheep simultaneously and since the heads of all such sheep are disposed within the operating enclosure 11, drenching operations on successive sheep may be carried on without any lag, since as soon as some sheep are drenched and leave the stalls, others are advanced into the empty stalls to take their place, by suitable rotation of the turntable by an operator on the outside.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In sheep drenching, an apparatus for disposing sheep in position for drenching comprising a turntable platform having a central operating enclosure outlined by an upstanding wall, partitions on the platform radiating out from the wall to form individual sheep stalls, of which said wall forms the head, the wall at each stall having a head receiving opening, and means to feed sheep into the stalls from the outer end thereof upon rotation of the turntable.

2. An apparatus as in claim 1, in which said means comprises a stationary chute disposed in radiating relation to the turntable on the level thereof and of a width to receive sheep in single-file order.

3. An apparatus as in claim 1, in which said means comprises a stationary chute disposed in radiating relation to the turntable on the level thereof and of a width to receive sheep in single-file order, and a corral connected to the outer end of the chute and including side members diverging from the chute.

4. An apparatus as in claim 1, in which said means comprises a stationary chute disposed in radiating relation to the turntable on the level thereof and of a width to receive sheep in single-file order, a relatively long corral including side members diverging from the outer end of the chute and cross gates in the corral at intervals in its length to divide the same into a number of pens.

5. In sheep drenching, an apparatus for disposing sheep in position for drenching comprising a turntable platform elevated relative to ground level having a plurality of individual sheep stalls disposed thereon in radiating relation and open at the periphery of the platform, a stationary chute of a width to receive sheep in single-file order projecting from the platform at the level thereof, a corral at ground level connected to and leading from the outer end of the chute, a ramp in the corral leading from ground level to the chute and another ramp outside the corral leading from ground level to the platform.

6. In sheep drenching, an apparatus for holding sheep in position for drenching comprising a stall having a head wall provided with an opening to receive the head and neck of a sheep therethrough, a neck engaging clamping collar hinged on the stall side of the wall above the opening for swinging movement in a vertical plane and adapted to cooperate with the neck of the sheep in clamping relationship when said collar is swung down, means acting to swing the collar up, and releasable means to hold the collar in clamping position and against such upward swinging movement.

7. In sheep drenching, an apparatus for holding sheep in position for drenching comprising a stall having a head wall provided with an opening to receive the head and neck of a sheep therethrough, a neck engaging clamping collar hinged on the stall side of the wall above the opening for swinging movement in a vertical plane and adapted to cooperate with the neck of the sheep in clamping relationship when said collar is swung down, a spring acting to swing the collar up, a latch bar pivoted on the collar to one side of the opening and projecting through a slot in the wall to the opposite side thereof, and a member mounted on the wall to cooperate with the latch bar in releasable holding engagement.

8. In sheep drenching, an apparatus for holding sheep in position for drenching comprising a stall having a head wall provided with an opening to receive the head and neck of a sheep therethrough, a neck engaging clamping collar hinged on the stall side of the wall above the opening for swinging movement in a vertical plane and adapted to cooperate with the neck of the sheep in clamping relationship when said collar is swung down, a spring acting to swing the collar up, a latch bar pivoted on the collar to one side of the opening and projecting through a slot in the wall to the opposite side thereof, said bar having notches in its upper edge, a latch plate mounted on the wall and cooperating with the notches and a spring between the bar and wall on said opposite side of the latter to releasably hold the bar engaged with the plate.

9. In sheep drenching, an apparatus for disposing sheep in position for drenching comprising a platform, a row of individual sheep stalls on the platform, each stall at its head end having an opening only of sufficient size to receive the head and neck of a sheep therethrough but being freely open at its opposite end for the entry and exit of the sheep, means mounting the platform for horizontal movement in a direction transversely of the stalls and stationary chute positioned to register with said opposite end of any one stall upon corresponding movement of the platform.

10. In sheep drenching, an apparatus for disposing sheep in position for drenching comprising a platform, a row of individual sheep stalls on the platform, each stall at its head end having an opening only of sufficient size to receive the head and neck of a sheep therethrough but being freely open at its opposite end for the entry and exit of the sheep, means mounting the platform for horizontal movement in a direction transversely of the stalls, a stationary chute positioned to register with said opposite end of any one stall upon corresponding movement of the platform, and a discharge ramp disposed to one side of the chute in position to register with said opposite ends of the stalls.

11. A structure as in claim 10, in which said ramp is of sufficient extent, lengthwise of the platform, to communicate with a plurality of stalls simultaneously.

12. In sheep drenching, an apparatus for disposing sheep in position for drenching comprising a platform, a row of individual sheep stalls on the platform, each stall at its head end having an opening only of sufficient size to receive the head and neck of a sheep therethrough but being freely open at its opposite end for the entry and exit of the sheep, means mounting the platform for horizontal movement in a direction transversely of the stalls, a stationary chute positioned to register with said opposite end of any one stall upon corresponding movement of the platform, and means mounting the platform above ground level a sufficient distance to enable an operator standing on the ground beyond the head ends of the stalls to conveniently drench sheep disposed in the stalls with their heads projected through the head openings of the stalls.

ROBERT L. ROBINSON.
ROBERT L. THOMPSON.